US012691416B2

(12) United States Patent
Tomescu et al.

(10) Patent No.: US 12,691,416 B2
(45) Date of Patent: Jul. 28, 2026

(54) FLAT SHEET MEMBRANE FILTRATION MODULE WITH CYLINDRICAL HOUSING

(71) Applicant: THETIS ENVIRONMENTAL INC., Hamilton (CA)

(72) Inventors: Alexandru Valeriu Tomescu, Mount Hope (CA); Ionel John Tomescu, Ancaster (CA)

(73) Assignee: THETIS ENVIRONMENTAL INC., Hamilton (CA)

( * ) Notice: Subject to any disclaimer, the term of this patent is extended or adjusted under 35 U.S.C. 154(b) by 658 days.

(21) Appl. No.: 17/297,873

(22) PCT Filed: Dec. 10, 2019

(86) PCT No.: PCT/CA2019/051779
§ 371 (c)(1),
(2) Date: May 27, 2021

(87) PCT Pub. No.: WO2020/118428
PCT Pub. Date: Jun. 18, 2020

(65) Prior Publication Data
US 2022/0016577 A1 Jan. 20, 2022

Related U.S. Application Data

(60) Provisional application No. 62/778,037, filed on Dec. 11, 2018.

(51) Int. Cl.
*B01D 63/08* (2006.01)

(52) U.S. Cl.
CPC ......... *B01D 63/082* (2013.01); *B01D 63/081* (2013.01); *B01D 63/084* (2013.01);
(Continued)

(58) Field of Classification Search
CPC .. B01D 63/082; B01D 63/081; B01D 63/084; B01D 2313/041; B01D 2313/143;
(Continued)

(56) References Cited

U.S. PATENT DOCUMENTS 3,926,813 A * 12/1975 de Putter ............... B01D 63/06
210/321.9
4,936,988 A 6/1990 Lueck et al.
(Continued)

FOREIGN PATENT DOCUMENTS

DE 2262918 A1 * 6/1974
DE 89 02 259 U1 4/1990
(Continued)

OTHER PUBLICATIONS

DE2262918A1—English Machine Translation (Year: 1974).*
(Continued)

*Primary Examiner* — Madeline Gonzalez
(74) *Attorney, Agent, or Firm* — Steve Leach

(57) ABSTRACT

A membrane module comprising a cylindrical housing containing a plurality of flat sheet membranes oriented parallel with a longitudinal central axis of the housing, the edges of the one or more flat sheet membranes being embedded in a potting material.

14 Claims, 12 Drawing Sheets

(52) U.S. Cl.
CPC .. *B01D 2313/041* (2022.08); *B01D 2313/143* (2013.01); *B01D 2313/205* (2022.08); *B01D 2323/21* (2013.01)

(58) Field of Classification Search
CPC .......... B01D 2313/205; B01D 2323/21; B01D 2313/025; B01D 2313/04; B01D 2313/06; B01D 2323/20
USPC .......................... 210/321.84, 321.61, 321.75
See application file for complete search history.

(56) References Cited

U.S. PATENT DOCUMENTS

| | | | |
|---|---|---|---|
| 5,000,855 A | 3/1991 | Nichols | |
| 5,626,752 A | 5/1997 | Mohn et al. | |
| 6,527,954 B1 | 3/2003 | Furuhashi | |
| 6,634,190 B2 | 10/2003 | Didier-Laurent | |
| 7,862,718 B2 | 1/2011 | Doyen et al. | |
| 8,393,477 B2 | 3/2013 | Kamleiter et al. | |
| 2013/0186827 A1 | 7/2013 | Farr et al. | |
| 2016/0151743 A1* | 6/2016 | Tomescu | B01D 63/081 |
| | | | 264/503 |
| 2018/0154313 A1 | 6/2018 | Osmundson et al. | |

FOREIGN PATENT DOCUMENTS

| | | |
|---|---|---|
| WO | 0062909 A1 | 10/2000 |
| WO | 2008141935 A1 | 11/2008 |
| WO | 2011026879 A1 | 3/2011 |
| WO | 2012098130 A1 | 7/2012 |
| WO | 20160112121 A1 | 7/2016 |
| WO | 2017070775 A1 | 5/2017 |

OTHER PUBLICATIONS

Doyen, Wim et al., "Spacer fabric supported flat-sheet membranes: A new era of flat-sheet membrane technology", Desalination, vol. 250, Oct. 14, 2009, pp. 1078-1082.
International Patent Application No. PCT/CA2019/051779, International Search Report and Written Opinion dated Mar. 5, 2020.
International Patent Application No. PCT/CA2019/051779, International Preliminary Report on Patentability dated Jun. 24, 2021.
European Patent Application No. 19894666.7, Extended European Search Report dated Mar. 11, 2022.

* cited by examiner

FLAT SHEET MEMBRANE FILTRATION MODULE WITH CYLINDRICAL HOUSING

RELATED APPLICATIONS

This application is a National Stage Entry of International Application No. PCT/CA2019/051779 filed Dec. 10, 2019, which claims priority to, and the benefit of, U.S. provisional patent application No. 62/778,037, filed on Dec. 11, 2018 and Canadian patent application number 3,037,541, filed on Mar. 21, 2019, which are incorporated herein by reference.

FIELD

This specification relates to membrane filtration modules, for example ultrafiltration, microfiltration, nanofiltration or reverse osmosis modules, and to methods of making them including a method of potting flat sheet membranes.

BACKGROUND

In U.S. Pat. No. 5,000,855 a wafer includes a plurality of transverse flat plates comprising sheet membrane carried in a generally cylindrical ring. A plurality of the wafers can be stacked in a housing to provide an apparatus for the separation of fluids.

U.S. Pat. No. 5,626,752 describes a membrane filtration module with a plurality of membrane units arranged sequentially in a cylindrical housing. Each unit has a plurality of spaced apart flat sheet membranes. Each flat sheet membrane has a stabilizing element between two outer membrane sheets.

INTRODUCTION

The following paragraphs are intended to introduce the reader to the detailed description to follow and not to limit or define the invention.

In a potting method described herein, a plurality of flat sheet membranes are potted into a housing in a centrifuge. The membranes are placed into the housing so that the membranes extend along the length of the housing. The housing is rotated around its central longitudinal axis while the housing is oriented horizontally. Liquid potting material is added into the housing while the housing is rotating. The potting material forms a layer on the inside of the housing. The potting material is allowed to solidify.

In some examples of the potting method, a set of flat sheet membranes is assembled into a stack, optionally with spacers between the membranes and/or stand-offs beside the stack. Optionally, the membranes have one or more notches in their edges. The stack is inserted into a round tubular housing with the membranes extending along the length of the housing. Optionally, one or more openings can be cut through the housing and partway into the potting material to expose permeate cavities inside of the membranes. Optionally, a permeate tube can be placed through the membranes. Optionally, a grill can be added covering the ends of the membranes at one or both ends of the tubular housing before or after adding the potting material.

In a membrane module described herein, flat sheet membranes extend along the length of a round tubular housing. Edges of the membranes are embedded in a layer of potting material on the inside of the housing.

In some examples of the module, the membranes are spaced apart from each other and parallel with a longitudinal central axis of the housing. The membranes have an inner cavity. Optionally, the membranes may be supported on a 3D spacer fabric. The membranes are rectangular with a pair of longer edges and a pair of shorter edges. The membranes are held by their longer edges in the layer of potting material. The potting material may have an essentially constant thickness, but for parts of the membranes, optional fillers or other components embedded within it. The potting material may extend along substantially the entire length of the membranes and optionally also along substantially the entire length of the housing. The shorter edges of the membranes may be sealed and optionally held in a grill at one or both ends of the housing. Optionally, one or more openings through the housing and extending into part of the potting material create a permeate withdrawal path between the inner cavities of the membranes and the outside of the module. Optionally, permeate is withdrawn from inner cavities of the membranes through a permeate tube.

A module as described herein can be used in the same manner, generally speaking, as a tubular membrane module. Prismatic flow channels are formed between pairs of flat sheet membranes and optionally between the two outer membranes and the inside of the potting material. The cross-section of the flow channels is the area formed between cords of the inside of the potting material. Most of these flow paths are generally rectangular or trapezoidal. Water flowing in these channels may behave as if flowing in a tube of slightly larger diameter than the spacing between pairs of flat sheet membranes. However, in some examples the surface area of the module described herein may be greater than in a comparable tubular module. In some examples, the module described herein may also be backwashed.

DETAILED DESCRIPTION

Figure 1:
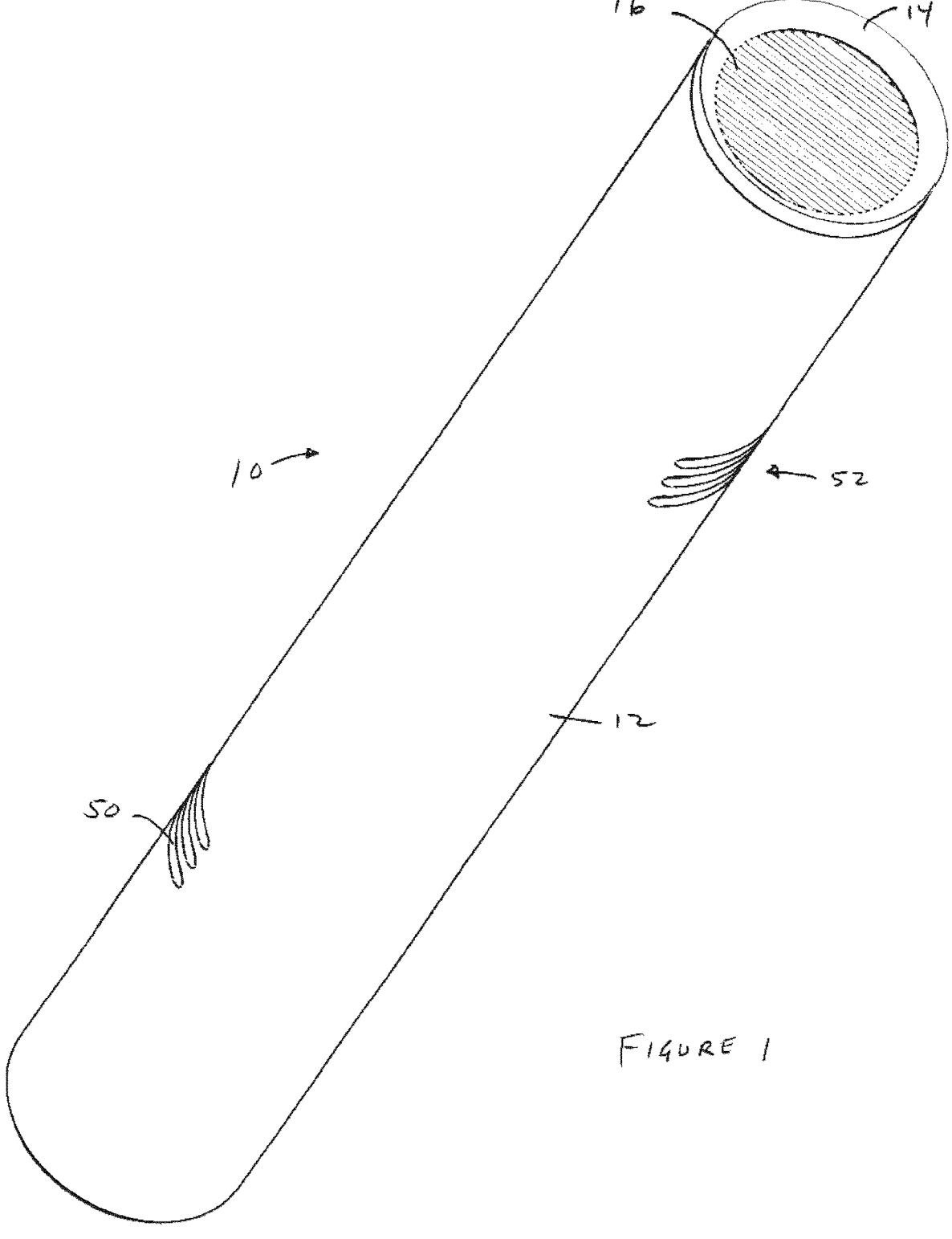
FIG. 1 is an isometric view of a membrane filtration module.
Figure 7:
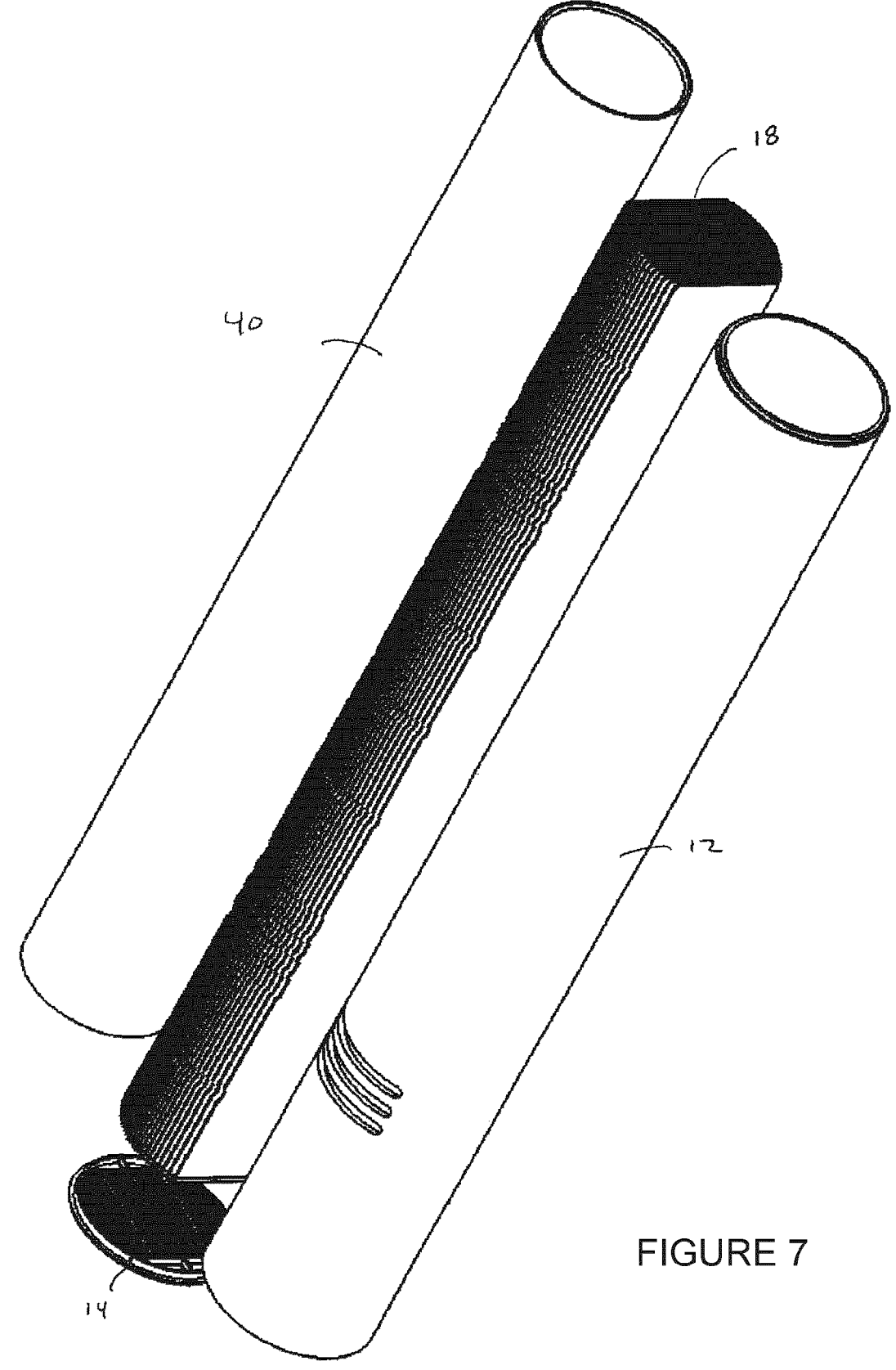
FIG. 7 is an isometric exploded view of the membrane filtration module of FIG. 1.

Referring to FIG. 1, an exemplary module 10 has a tubular housing 12, which forms an outer shell of the module 10. The module 10 can be, for example, from 1 m to 4 m in length. The housing 12 can have a diameter, for example, in the range of about 10 cm to about 80 cm or in the range of about 10 cm to about 35 cm. Optionally, the housing may be made from a section of SCH5, SCH10, SCH40, PVC, CPVC or SS pipe. FIG. 7 shows an exploded view of the module 10 including a stack of membranes 18 and potting material 40 that will be placed inside of the housing 12. In the stack, some of the membranes 18 may optionally be replaced with other flat plates.

Figure 4:
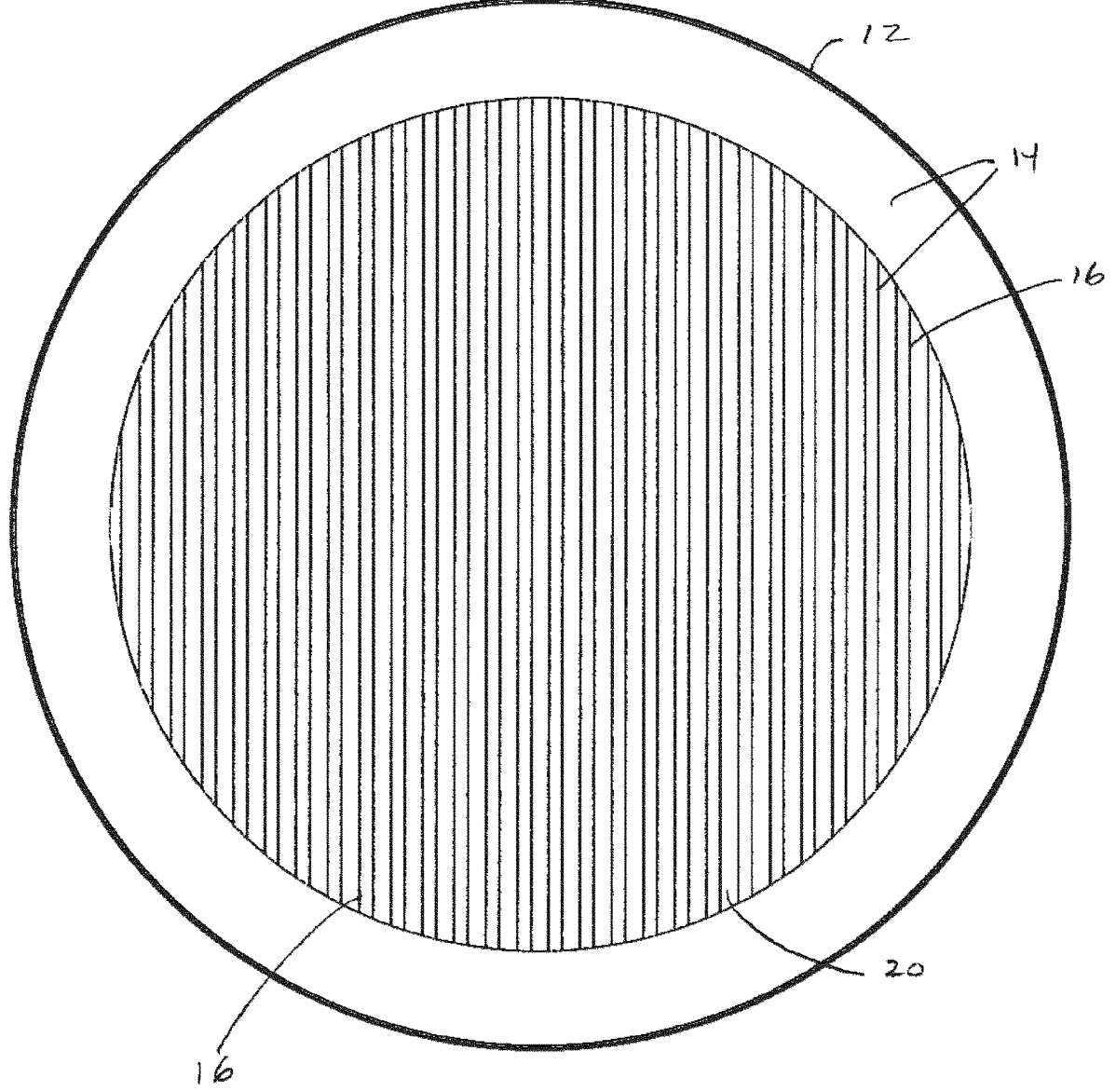
FIG. 4 is an end view of the membrane filtration module of FIG. 1 showing the front of a grill.
Figure 5:
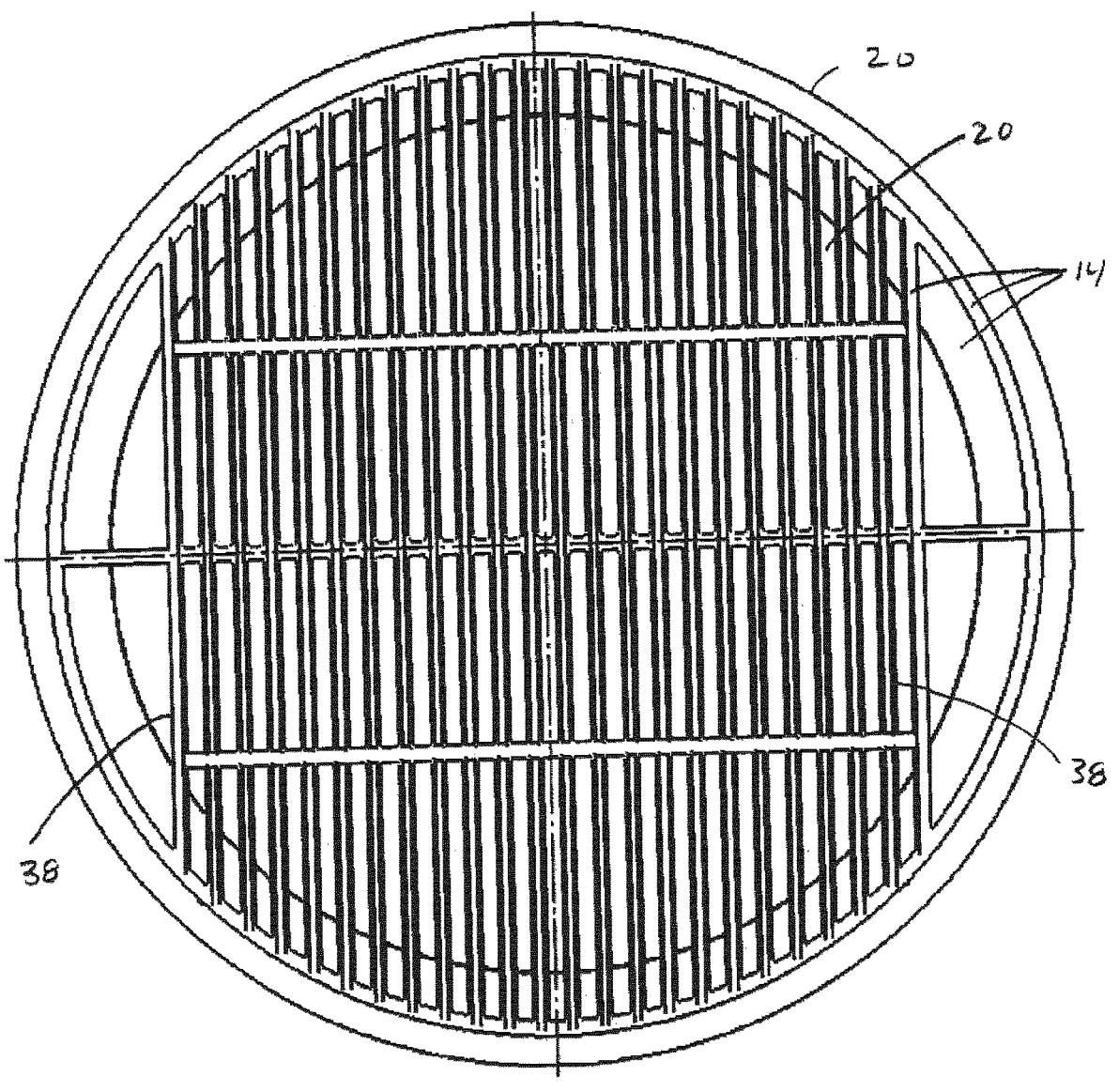
FIG. 5 is an end view of the membrane filtration module of FIG. 1 showing the back of the grill of FIG. 4.

Optionally, one or both ends of the module 10 have a grill 14. An end view of a module 10 showing the front side of the grill 14 is shown in FIG. 4. An outer part of the grill 14 is generally annular and fits against and/or inside of an end of the housing 12. In the example shown, a flange on a back side (not visible in FIG. 4) of the grill 14 fits inside of the inside diameter of the end of the housing 12. The grill 14 also has various fins 16. The ends of the flat sheet membranes 18 are sealed and optionally adhered to the fins 16. FIG. 5 is an end view from the opposite side of the module 10 showing the back of the grill 14 inserted into a housing 20 but without potting material 40 or membranes 18. The fins 16 are open on a back side with slots 38 that receive the ends of the flat sheet membranes 18, which are compressed to fit in the slots 38 as they are sealed, i.e. by welding or with an adhesive. The fins 16 protect the ends of the membranes 18, provide a smooth flow path around the ends of the membranes 18 for water entering the module 10, and help support the ends of the membranes 18 such that an intended spacing 20 between membranes 18 is preserved against the force of water entering the module 10. A grill 14 is particularly useful at a first, or inlet, end of the module 10, but may optionally be used at a second, or outlet, end of the module 10.

Referring again to FIG. 7, the module 10 has a stack of parallel, spaced apart membranes 18. The membranes 18 are held in a mass of potting material 40. The potting material 40 may be in the shape of a tube and may be coaxial with the housing 12. At least some of the outer surface of the potting material 40 is directly adjacent to, and preferably adheres to, the inner surface of the housing 12. The inner surface of the potting material 40 defines a generally cylindrical plenum containing un-potted portions of the flat plates 18. When assembled, long edges of the flat plates are embedded in the potting material 40. The potting material 40 forms an annular layer inside of the housing 12. The annular layer has a generally constant thickness, but for parts of the annular layer that are interrupted by the flat plates 18, optional fillers, or other structures.

Figure 9:
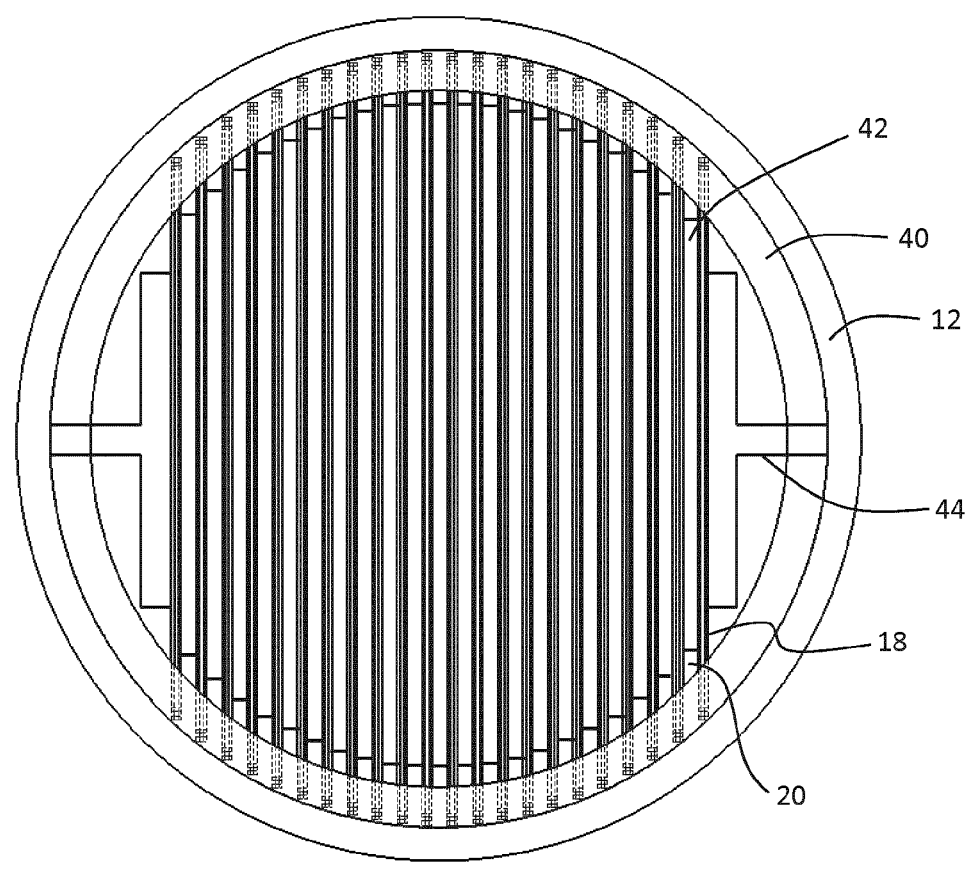
FIG. 9 is a schematic cross section of the membrane filtration module of FIG. 1 during a potting procedure.

FIG. 9 is a schematic cross section of the module 10 while it is being potted. The membranes 18 can be spaced apart at a specified spacing 20. This spacing 20 can be identical for all membranes 18 or vary, for example across the width of housing 12 and/or along the length of the housing 12. Optionally, removable spacers 42 can be used to control the spacing 20 during potting. The spacers 42 are inserted between pairs of membranes 18 to form a stack of spaced apart membranes 18, which may be inserted into the housing 12 for potting. The spacers 42 are preferably removed after the potting material 40 solidifies. The spacers 42 are narrower in width than the membranes 18 as required to prevent the spacers 42 from being embedded in the potting material 40. However, the spacers 42 may extend close to, for example to within 20 mm or within 10 mm of, the inside surface of the potting material 40. The spacers 42 are particularly useful when the membranes 18 are flexible such that the membranes 18 would otherwise bend materially in response to the force of centrifugal potting. Alternatively, sufficiently rigid membranes 18 can be potted with narrower (in width) spacers 42 or without spacers 42.

Figure 6:
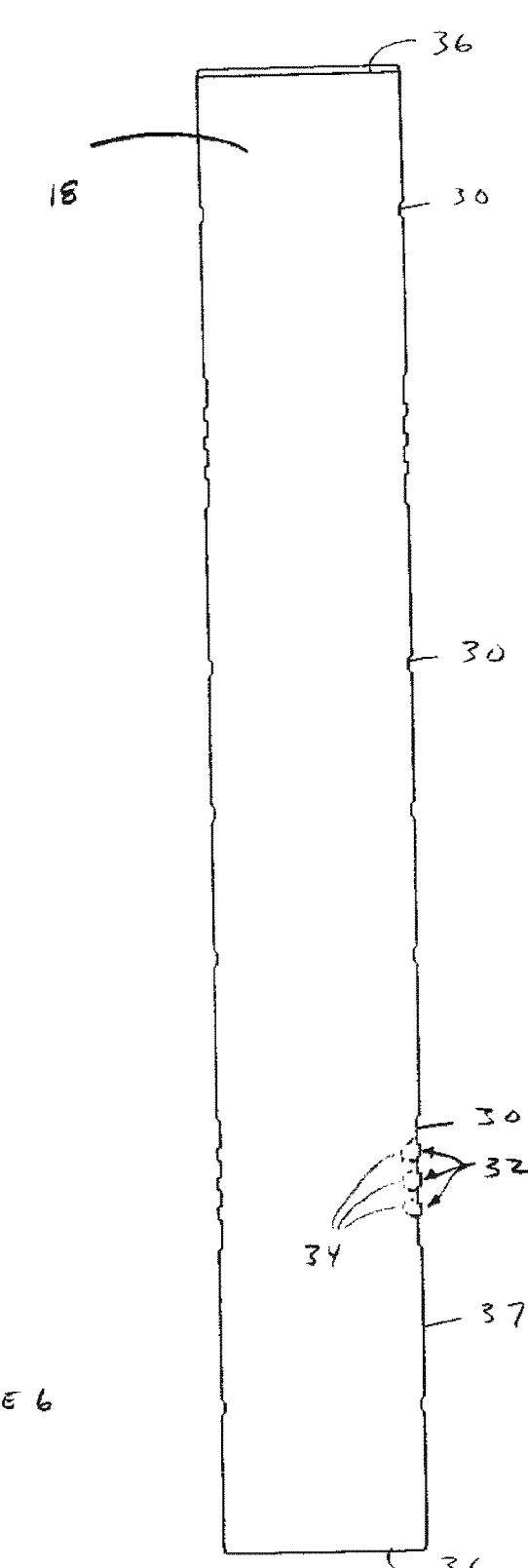
FIG. 6 is a side view of a flat sheet membrane of the membrane filtration module of FIG. 1.

An example of a flat sheet membrane 18 is shown in side view in FIG. 6. It is generally desirable to have a large surface area of membrane 18, so the length of the flat sheet membrane 18 is similar to the length of the housing 12. However, a membrane 18 may be shorter than the housing 12, for example to account for the thickness of optional inlets or outlets to the housing 12 such as a grill 14 or to allow potting material 22 to be added to the housing 12 during potting and encase one or both ends of the membranes 18. The membrane 18 optionally has a length that is 80% or more or 90% or more of the length of the housing 12. The width of each membrane 18 is selected to be generally the same as the distance across the inside of the housing 12 (i.e. an interior cord of the housing 12) at one of a plurality of selected locations of the membranes 18. This distance varies with displacement from a central axis of the housing 12 and so a set of membranes 18 for a module 10 includes membranes 18 of a plurality of widths. Optionally, one or both ends (short edges) of the membranes 18 may be reinforced, streamlined or fitted with a protector or fairing to help the flat plates withstand forces of liquids flowing through the housing 12.

Figure 8:
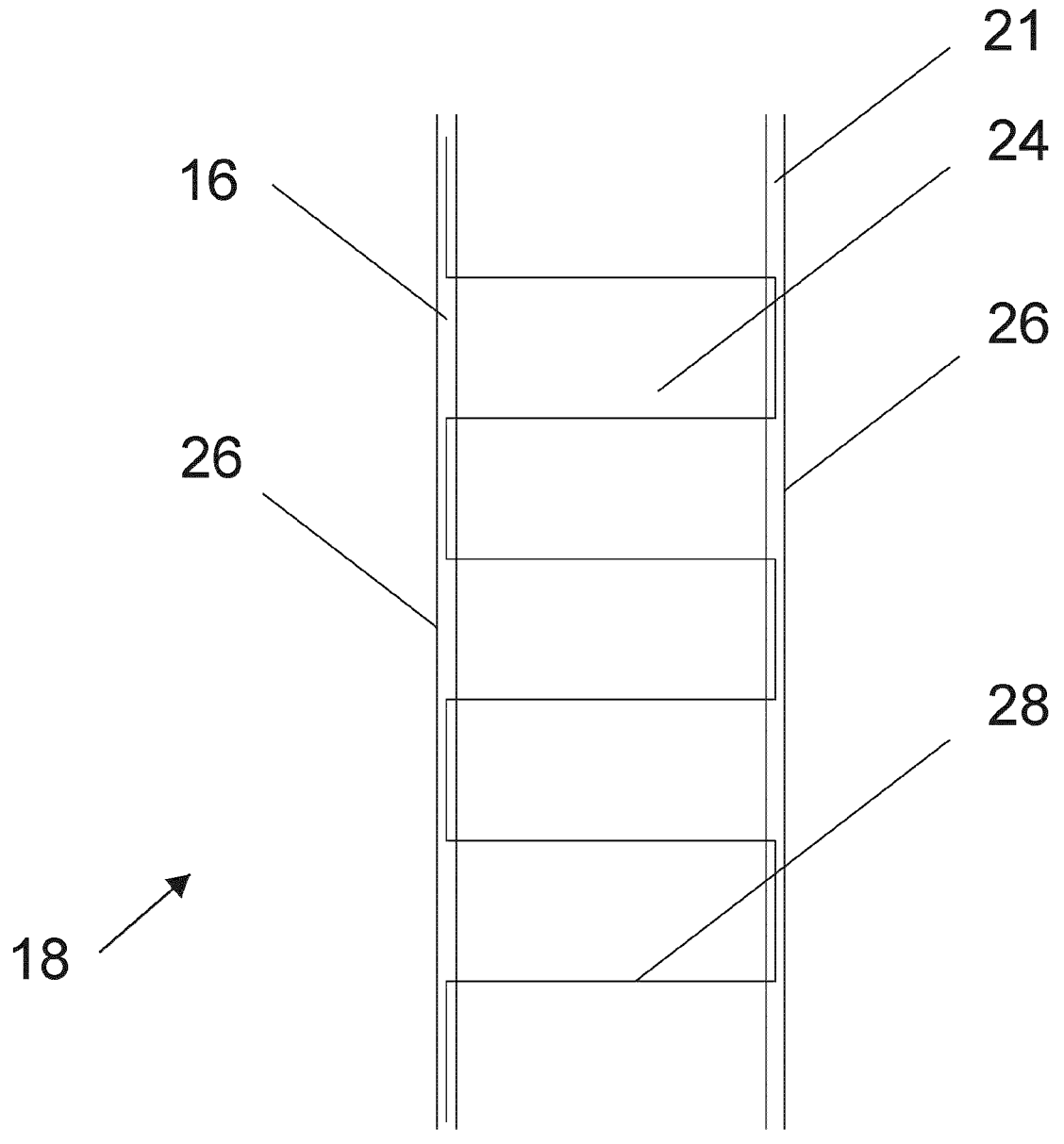
FIG. 8 is a cross section of the flat sheet membrane in FIG. 6.

A module 10 has a plurality of flat plates. One or more of the flat plates may be flat sheet membranes 18. FIG. 8 shows a schematic cross section of an optional example of a flat sheet membrane 18. Alternatively, one or more of the flat plates may be solid or other non-membrane or non-permeating plates located in place of a membrane 18. The thickness of the flat sheet membrane 18 is exaggerated in FIG. 8 to show some of the features. Generally speaking, the flat sheet membrane 18 has two porous outer surfaces 21 separated by a drainage layer 24. The outer surfaces 21 may have pores, for example, in the microfiltration (MF), ultrafiltration (UF) or nanofiltration (NF) or reverse osmosis (RO) range. Permeate passes through the outer surfaces 21, either by way of pressure applied to the outside of the membrane 18, suction applied to the inside of the membrane 18, or both. Permeate is collected in the drainage layer 24. Optionally, the drainage layer 24 at the ends (short edges) of the flat plates 18 may be sealed. The drainage layer 24 may be left open along some or all, for example 50% or more or 80% or more, of the length of the edges (long edges) of one or more of the membranes 18.

Flat sheet membranes 18 are typically formed with a sandwich or envelope construction wherein a membrane forming dope is cast onto a non-woven substrate and quenched to form the porous outer surfaces 22. Examples of this type of flat sheet membrane 18 are described in In U.S. Pat. Nos. 5,000,855 and 5,626,752, which are incorporated herein by reference.

In the particular example shown in FIG. 8, the outer layers of a 3D spacer fabric 28 are each embedded directly in a layer of porous polymer 26, for example a PVDF, PES or PS based polymer, which is formed by casting a membrane forming dope directly onto the 3D spacer fabric 28. The ends 36 of the membranes 18 are optionally sealed, for example by filling the spacer fabric 28 or other drainage layer 24 with an adhesive at the ends 36 of the membrane 18, and optionally by compressing the ends 36 of the membrane 18 to partially or completely collapse the spacer fabric 28 or other drainage layer 24.

The 3D spacer fabric 28 may alternatively be called a double face or double cloth fabric or, for brevity, a 3D spacer or a spacer fabric. The 3D spacer fabric 28 is made, for example by knitting or weaving, such that it has an inner space between two outer layers. One or more threads that are also woven or knitted into the outer layers extend across the inner space to connect the outer layers together, and optionally also space the outer layers apart. In some examples, the inner space between the two outer layers is partially further filled, for example with another fabric layer. A membrane forming dope can be cast onto the outer layers and flows at least part way through the thickness of the outer layers before being quenched to form a layer of porous polymer 26. The outer layers of the spacer fabric 28 are thereby at least partially embedded in the dope, and in the porous polymer 26 obtained by quenching the dope. In use, permeate flows through, and is withdrawn, from the drainage layer 24 that remains open in the inner space of the spacer fabric 28. Such membranes 18 are sometimes referred to as integrated permeate channel membranes in the art and are useful in the module 10 described herein because they have material stiffness. In other examples, a membrane 18 includes a membrane coated woven or non-woven substrate fabric which provides the porous outer surfaces 22 that is attached to the outside of a 3D spacer fabric which provides the drainage layer 24.

Examples of suitable integrated permeate channel membranes are described in: U.S. Pat. No. 8,393,477 B2, Filter Medium; International Publication Number WO 2011/026879 A1, Frame for Supporting a Filter Membrane; International Publication Number WO 2008/141935 A1, Membrane Bags with Seamless Membrane Substance, Uses Thereof and Filtration Units Therewith; International Publication Number WO 2012/098130 A1, A Tridimensional Woven Fabric, an Integrated Permeate Channel Membrane Comprising Said Fabric and Uses Thereof; U.S. Pat. No. 7,862,718 B2, Integrated Permeate Channel Membrane; or US Patent Application Publication Number US 2013/0186827 A1, Forward Osmosis Membrane Based on an IPC Spacer Fabric. In other examples, a membrane may be made with other spacer fabrics 28. For example, suitable spacer fabrics 28 are described in U.S. Pat. No. 6,634,190 B2, Double-Faced Thick Knitted Fabric with Flexible Structure and German Gebrauchsmuster 89 02 259 U1. Warp-knitted spacer fabric 28 made for other applications, such as automobile interiors or clothing, may also be used, for example as sold by Eastex Products, Apex Mills or Jason Mills.

The flat sheet membranes 18 may be microfiltration (MF), ultrafiltration (UF), nanofiltration (NF) or reverse osmosis (RO) membranes. The porous polymer 26 may be made, for example, of PVDF, PES or PS with or without various additives as known in the art. The flat sheet membranes 18 may have a thickness, for example, in the range of 1.0 to 5.0 mm, or 1.5 mm to 3.0 mm. The center-to-center spacing of the flat sheet membranes 18 may be, for example, in the range of 2 mm to 20 mm, or 4 mm to 12 mm.

Referring again to FIG. 9, the long edges of the membranes 18 are embedded in potting material 40. The potting material 40 may flow part way into the inner space of the flat plates 18. The potting material 40 may be, for example, a polyurethane or epoxy. The thickness of the potting material 40 may be, for example, in a range of 5 mm to 25 mm or 5 mm to 20 mm.

Figure 10:
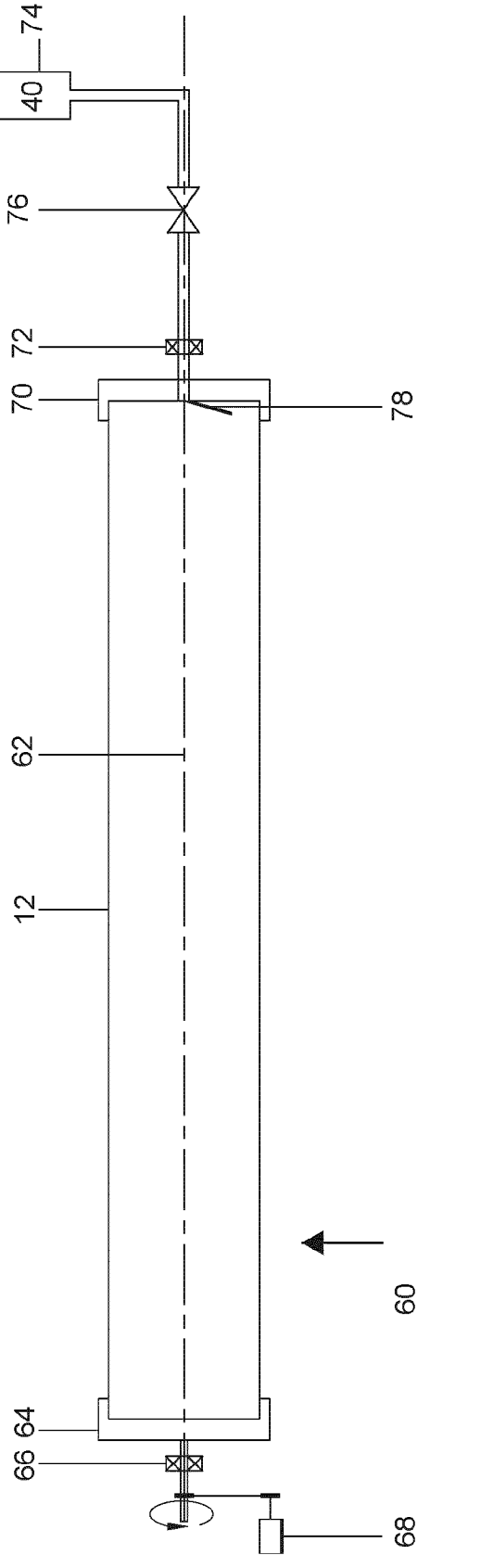
FIG. 10 is a schematic view of a potting device.

The potting material 40 is added to the housing 12 in a potting process. In one example, a stack of membranes 18 is formed as shown in FIGS. 7 and 9. Optionally, the ends 36 of the membranes 18 are sealed closed. Optionally, one end 36 of each membrane 18 is glued into a grill 14. The stack of membranes 18 is then inserted into the housing 12, optionally with the end of the housing 12 fitting into a flange of the grill 14. Ends 36 of the membranes 18 not in a grill 14 are optionally located in a range of about 3 mm to 30 mm from an end of the housing 12. Referring to FIG. 10, the housing 12 is then placed in a centrifuge 60 with its central longitudinal axis 62 horizontal. One end of the housing 12 is held in a first fitting 64 supported on a bearing 66 on a shaft connected to a motor 68. The other end of the housing 12 is held in a second fitting 70 supported on a ring of bearings 72 or a bearing 72 on a hollow shaft connected to second fitting 70. Alternatively, one or both ends of the housing may be supported on bearings that contact the housing 12 directly. The housing 12 is rotated around its central longitudinal axis 62 by the motor 68. Liquid potting material 40 is added to the housing 12 from a tank 74 while the housing 12 is rotated, for example by opening a valve 76 in a pipe connecting tank 74 to a nozzle 78 in communication with the inside of the housing 12 through the hollow shaft. Alternatively, liquid potting material 40 may be pumped into the housing 12. The liquid potting material 40 disperses across the inside of the housing 12 to form a layer of potting material 40, optionally an annular layer of substantially uniform thickness but for items embedded in the potting material 40, inside of the housing 12.

The potting material 40 optionally extends along substantially the entire length of the housing 12, for example along 80% or more or 90% or more of the length of the housing 12. In the example shown, a grill 14 is installed on one end of the housing 12 and provides an annular barrier defining one end of the potting material 40. The second fixture 70 of the centrifuge provides an annular barrier at the other end of the housing 12. The potting material 40 thereby extends from the back side of the grill 14 to the opposing edge of the housing 12. Alternatively, the first fixture 64 and the second fixture 70 of the centrifuge may provide annular barriers at the ends of the housing 12 to contain the potting material 40.

The potting material 40 is allowed to at least gel, or partially solidify, while the module 10 is rotating, but curing may continue after the module 10 is removed from the centrifuge. In the resulting module 10, both long edges of each membrane 18 is held essentially along its entire length in the potting material 40. Defined prismatic flow channels, which are areas between two cords but similar to narrow rectangular or trapezoidal tubes, are thereby created in the spaces 20 between adjacent membranes 18 and the potting material 40.

To assist in the potting process, referring to FIG. 9, inter-plate spacers 42 may be added between the membranes 18 before the module 10 is potted and removed after potting. Optionally, a T-spacer 44 or a similar stand-off to the housing 12 may also be used during potting to help center the stack of membranes 18. T-spacer 44 can remain in the module 10 after potting. In another option, at least the outer membranes 18 may be rigid plates, or may be replaced with non-permeating and optionally solid rigid plates, that help center the stack of membranes 18 by way of interference fit against the inside of the housing 12 and/or against a T-spacer 44 or narrower stand off.

Referring back to FIG. 6, a membrane 18 (and any optional non-permeating flat plate) can have one or more notches 30 in one or both of its edges. These notches 30 are shallow, and in particular do not extend inwards beyond the expected location of the inside surface of a potting material 40. During the potting process, the notches 30 help ensure that potting material 40 can flow past the edges of the membranes 18 even if an edge of a membrane 18 is very close to, or directly in contact with, the inside of housing 12. The edges of the membranes 18 may be in contact with the inside of housing 12, or if not in contact at least close to, for example within 3 mm of, the inside of the housing 12.

Before being potted, the membranes 18 are also given one or more blocked regions 32 filled with a blocking material 34. The blocking material 34 may be, for example, a water-soluble wax. The blocked regions 32 extend inwards beyond the expected location of the inside surface of the potting material. The blocked regions 32 therefore do not become filled with, or surrounded by, potting material during the potting process. As will be discussed further below, after the potting material 40 has been added to the module 10, the blocked regions 32 can be exposed to the outside of the module 10, for example by making a passage (such as a hole or slot) through the housing 12 and any potting material between the edge of the membrane 18 and the inside of the housing 12. The blocking material 34 can be removed, for example by melting or dissolving it. With the blocking material 34 removed, the passage connects the spacer fabric 28 or other drainage layer 24 of the membrane 18 with the outside of the module 10. In other examples, blocked regions 32 can be created by forming a U-shaped seal, at least as high as the thickness of the potting material but open towards the longitudinal central axis of the housing, through the drainage layer 24 of the membranes 18 or by using a permanent insert of similar configuration to the U-shaped seal. The bottom of the U-shaped seal is cut open after potting by a hole or slot made through the housing to create a fluid connection between the drainage layer 24 and the outside of the housing 12. Ends 36 of the membranes 18 are optionally sealed closed before potting. The drainage layer 24 of the membranes 18 is open to the long edges 37 of the membranes other than in the blocked regions 32.

Figure 2:
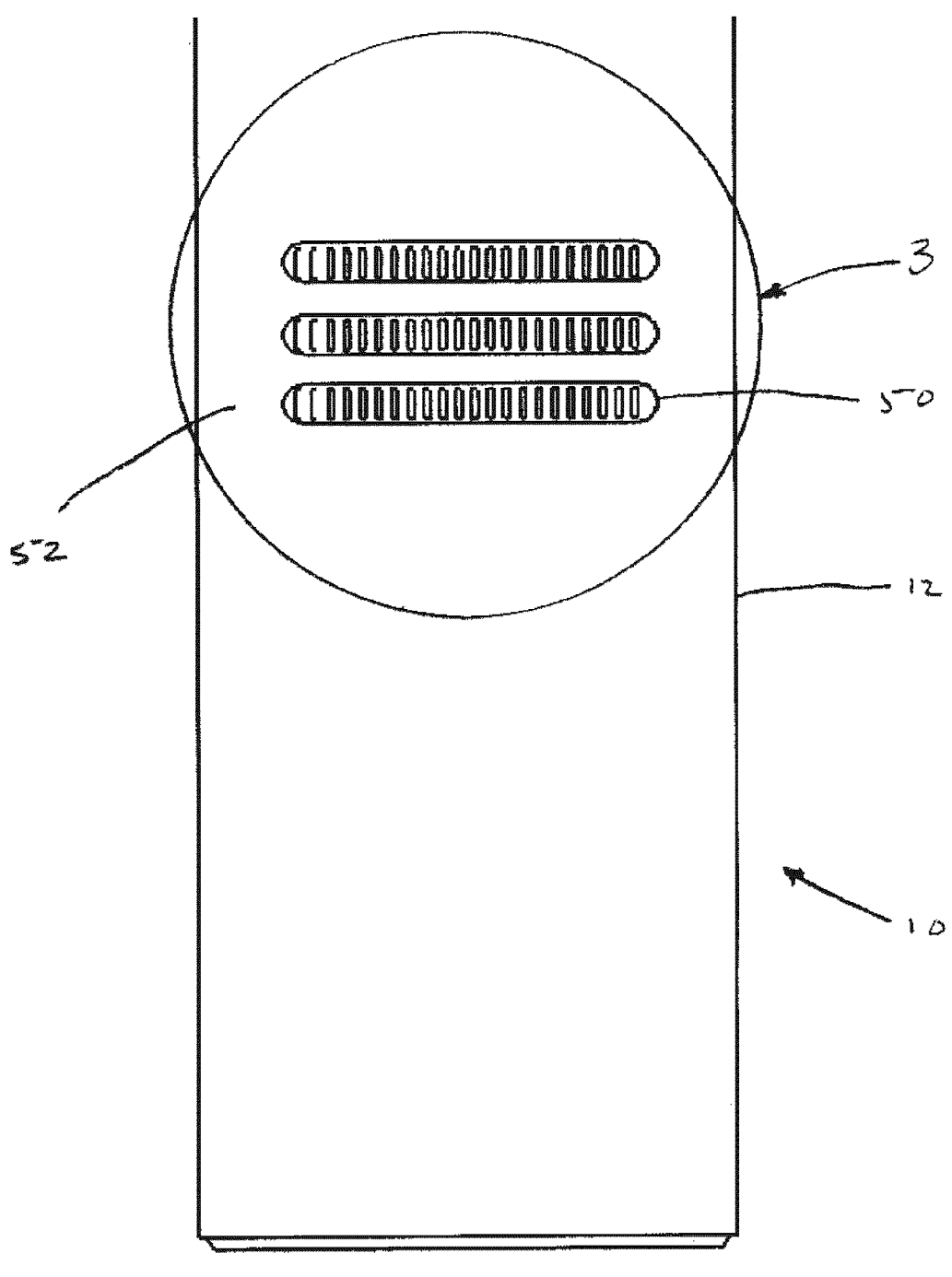
FIG. 2 is a side view of the membrane filtration module of FIG. 1.
Figure 3:
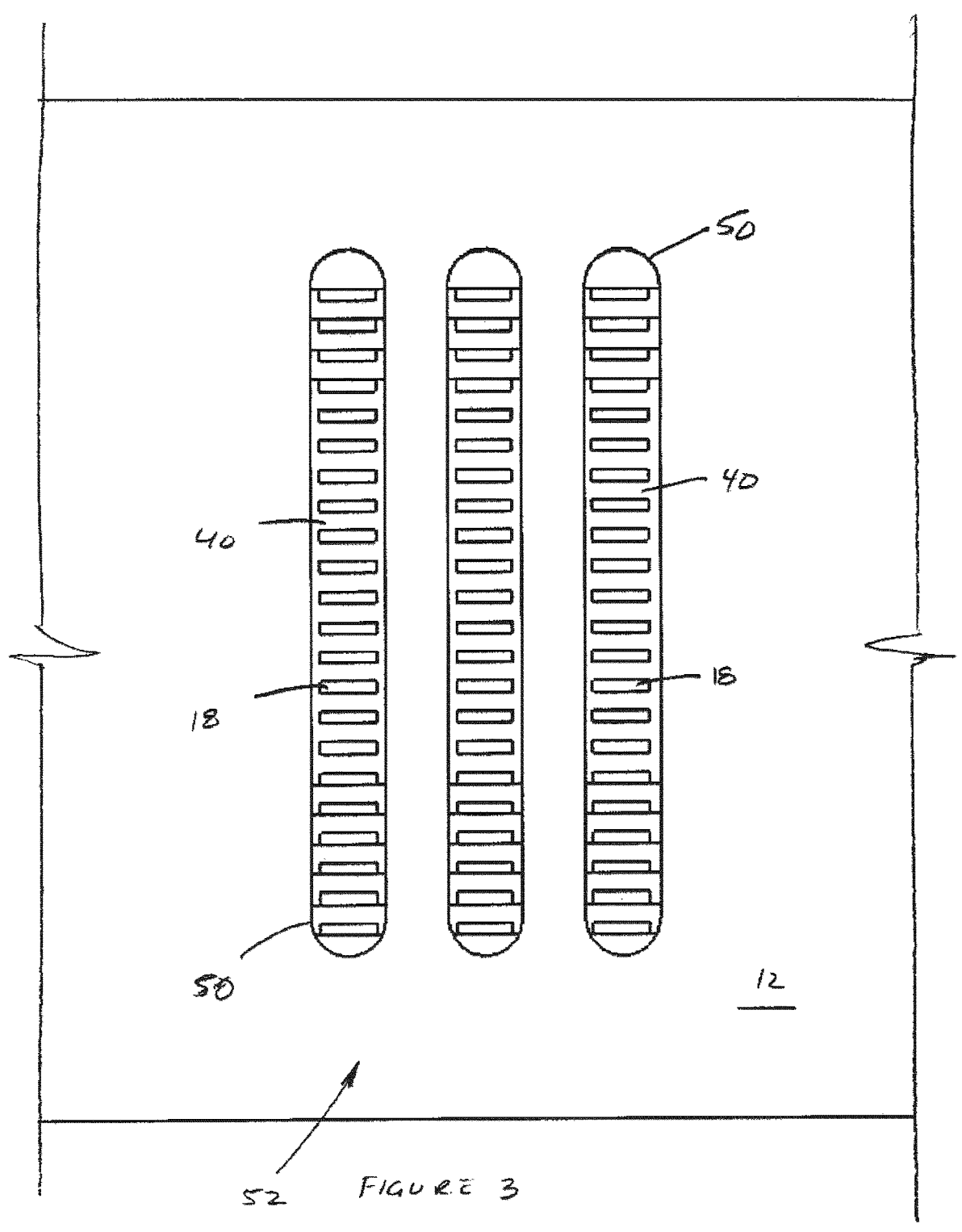
FIG. 3 is an enlarged view of a part of the membrane filtration module indicated in FIG. 2.

Referring to FIGS. 1-3, in the example shown permeate passages are created by cutting slots 50, for example with a plunge router held against the outside of the housing 12, through the housing 12 and partway through the potting material 40. The slot 50 does not extend through the entire thickness of the potting material 40, but does extend far enough into the potting material to also cut into part of the membranes 18, in particular part of the blocked regions 32 of the membranes 18. Once the blocking material 34 is removed, permeate can be collected from a slot 50.

A region of the module 10 having one or more slots 50 or other permeate passages can be called a permeation zone 52. The module can have one or more permeation zones 52. Optionally, the permeation zones 52 may be located at one or more of the ends of the module 10, the middle of the module 10 or spaced along the length of the module 10. In some examples, permeation zones 52 are provided at a distance, the distance being in a range of 20% to 40% of the length of the module, from each end of the module 10.

A permeation zone 52 can have one or more permeation slots 50 or other passages. For example, a permeation zone 52 may have 1 to 7 or 3 to 7 permeation slots 50. A permeation slot 50 may be, for example, in a range of 1 mm to 55 mm wide, 3 mm to 55 mm wide or 10 mm to 55 mm wide. The number and width of permeate slots 50 may be selected to avoid a material head loss to permeate flow in a permeation zone 52. Multiple permeation slots 50, separated by strips of remaining housing material, are preferred over a single permeation slot 50 of the same total width to reduce loss of mechanical strength of the housing 12.

Figure 12:
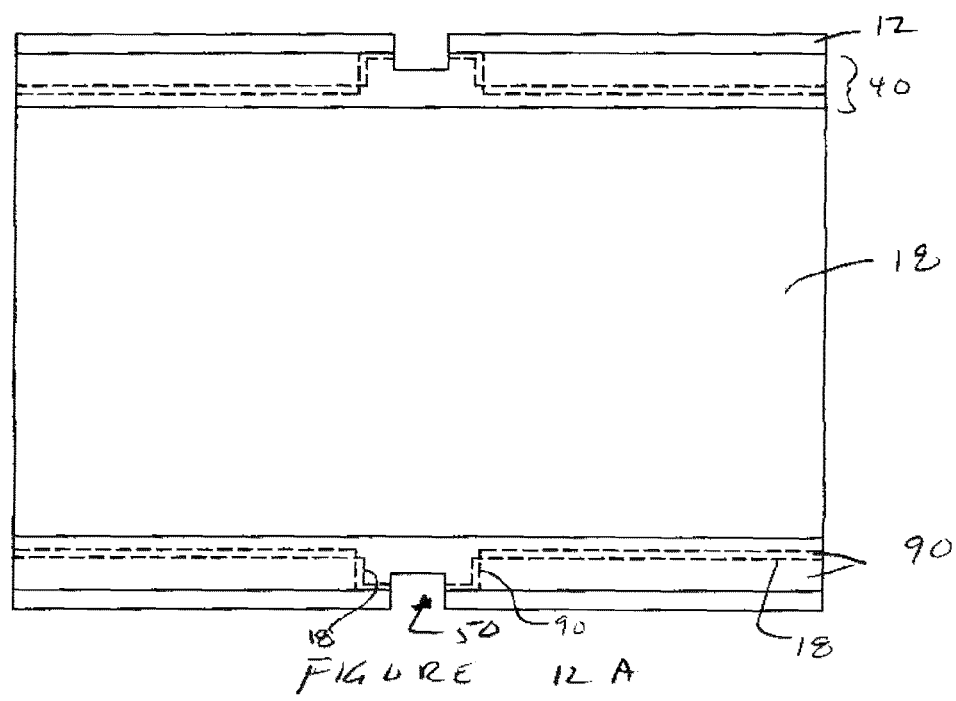
FIGS. 12A and 12B are a schematic drawings of a lengthwise section of a membrane filtration module having fillers with edges of the membranes seated in the fillers in FIG. 12A and not seated in the fillers in FIG. 12B.
Figure 12:
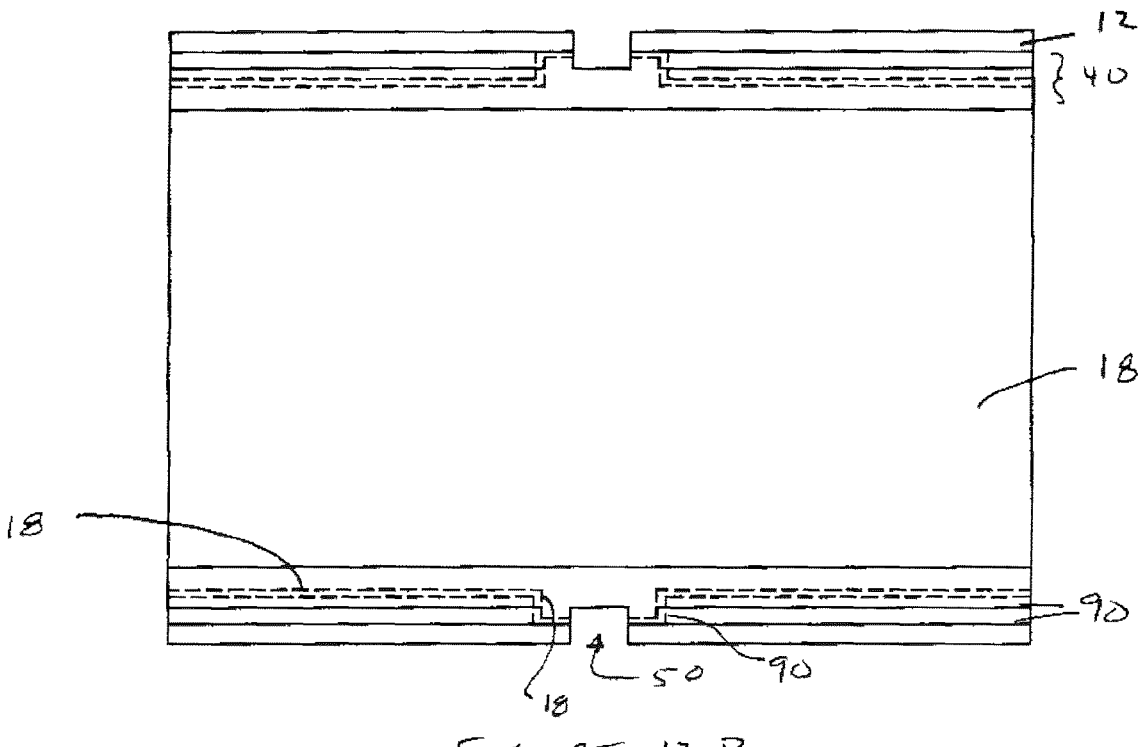

Optionally, as shown in FIGS. 12A and 12B, fillers 90 are placed in the housing 12 beside or between the permeation slots 50. The fillers 90 may be made of a foam or other lightweight material. The fillers 90 can have a generally cylindrical outer surface that fits against the inside surface of the housing 12. The fillers 90 become embedded in the potting material 40. Although the fillers 90 are shown directly abutting the inside of the housing 12, the centrifugal force during potting typically forces a layer of potting material 40 between the inside of the housing 12 and the outside of the filler 90. Radial holes through the fillers 90 and/or longitudinal grooves in the outside of the filler 90 may be added to encourage potting material 40 to completely encase the fillers 90 and/or to provide potting material extending through and strengthening the fillers 90. The fillers 90 reduce the total volume and weight of potting material 40 without affecting the strength of the potting material 40 in critical regions, in particular around the permeation slots 50. Preferably, the fillers 90 do not protrude through the inner surface of the potting material 40 so they are not exposed to liquid being treated in the module 10. The potting material 40 is therefore considered to still be an annular layer of generally constant thickness. The long edges of the membranes 18 are recessed to accommodate the fillers 90. In one option shown in FIG. 12A, the long edges of the membranes 18 are recessed but fit into slots in the fillers 90. In this option, the fillers 90 can perform a structural function of maintaining the spacing 20 to the long edges of the membranes 18 during assembly and potting. Optionally, with sufficiently rigid membranes 18, the spacers 42 and/or stand-offs 44 may not be required. In another option shown in FIG. 12B, the long edges of the membranes 18 are recessed such that they are within the fillers 90. In this case, the fillers 90 do not help to support the edges of the membranes 18 during potting but the filler 90 has a simpler shape and the thickness of the potting material 40 around the long edges of the membranes 18 is increased.

In use, permeate flows out of the permeation zones 52. The permeate may be collected by a fitting attached around the permeation zone 52. For example, a split pipe coupling, for example a Straub coupling, can be clamped around the housing 12 such that it covers the permeation zone 52. The ends of the couplings are sealed to the housing, for example with O-rings or extruded gaskets. A hole is drilled in one side of the coupling and tapped or otherwise adapted to receive the end of a permeate pipe or a fitting for a permeate pipe.

The ends of the flat sheet membranes 18 can be sealed individually. Alternatively or additionally, the ends of multiple or all of the flat sheet membranes can be located inside of, and optionally adhered to, a common grill 14. The grill 14 is optional, but may be used at the inlet end of the module 10 or at both ends of the module 10. The grill 14 can form fairings to smooth the flow of liquid over the ends of the membranes 18 and/or the flow over the edge of the potting material 40. The ends of the membranes 18 may be inserted in the grill 14 and/or may be attached to the grill 14 for example by an adhesive (i.e. urethane, epoxy or hot melt glue) or sonic welding.

In a filtration system, the ends of the modules 10 are attached to a feed pipe at an inlet end of the module 10 and a concentrate pipe at an outlet end of the module 10. These connections can be made, for example, by split pipe couplings such as Straub couplings. Alternatively, the housing may be threaded to accept a threaded pipe coupling or a coupling may be glued to the housing. As discussed above, the permeation zones 52 are connected to permeate pipes. Feed water is typically forced through the module 10, and in particular the spaces 20 between the membranes 18, by a pump. Transmembrane pressure can be created by one or more of the pressure of the feed water and suction applied to a permeate pipe.

In other examples, permeate can be collected from a fixture connected to an open portion of the short edge of the membranes 18. In other examples, permeate outlets can extend through the housing 12 into the long edges of the flat plates 18.

Figure 11:
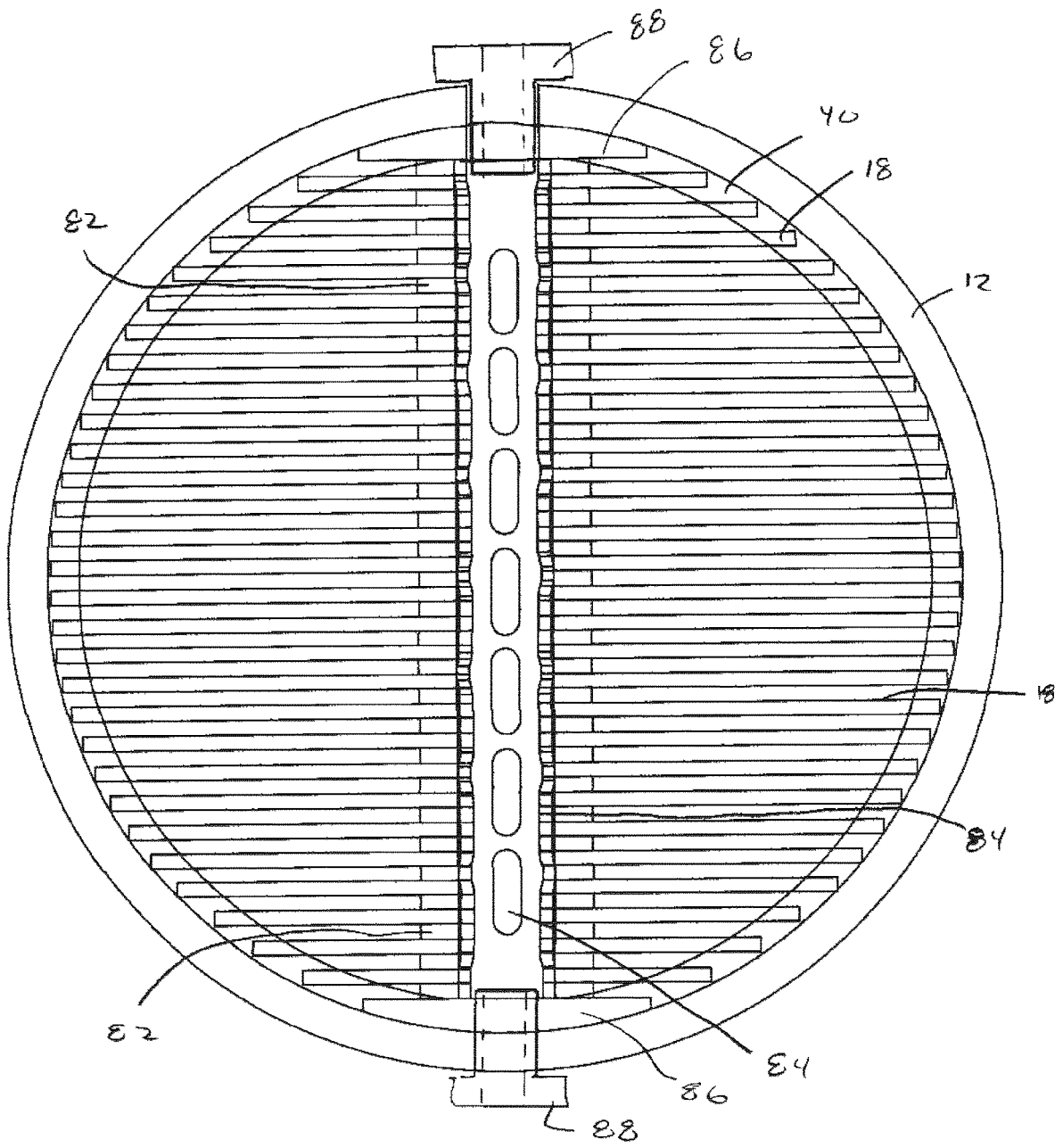
FIG. 11 is a cross section of another membrane filtration module having a permeate collection pipe.

Referring to FIG. 11, in another example, a permeate collection pipe 80 extends perpendicularly through the membranes 18. Gaskets 82 between the membranes 18 seal the drainage layer 24 of the membranes 18 to the permeate collection pipe 80. Holes 84 in the sides of the permeate collection pipe 80 allow permeate to enter the permeate collection pipe 80. Optional pads 86 at the ends of the permeate collection pipe 80 can be used to bear against the outer gaskets 82. The pads 86 may also compress the gaskets 82 or the gaskets may be glued to the membranes 18 and the pads 86. The pads 86 can also increase the bearing area between the permeate collection pipe 80 and the inside of the housing 12. The stack of membranes 18 is formed on the permeate collection pipe 80 before the stack of membranes 18 is inserted into the housing 12 for potting. A fitting 88 is placed through the housing 12 and inserted into, or at least sealed to the inside diameter of, the permeate collection pipe 80, on one or both ends of the permeate collection pipe 80, to hold the permeate collection pipe 80 in position during potting and/or to provide a permeate outlet. Optionally, the spacers 42 are notched to fit around the permeate collection pipe 80, or a pair of spacers 42 is used, one on each side of the permeate collection pipe 80. Alternatively, with sufficiently stiff membranes 18 and/or with a filler added on the inside of the housing to hold the long edges of the membranes 18, the spacers 42 may be omitted. Stand offs 44 are typically not required since their function is generally provided by the pads 86.

We claim:

1. A membrane module comprising, a tubular housing with round cross section;

a plurality of flat sheet membranes inside of the tubular housing; and, a layer of potting material on the inside of the tubular housing, wherein the flat sheet membranes are oriented parallel with a longitudinal central axis of the housing and edges of the plurality of flat sheet membranes are embedded in and rigidly, adhesively connected to the potting material;

the potting material extends along the entire length of the flat sheet membranes; and the potting material has an essentially annular shape and an essentially constant thickness.

2. The membrane module of claim 1 wherein the plurality of sheet membranes are parallel to each other and spaced apart from each other in a direction perpendicular to the longitudinal central axis of the housing.

3. The membrane module of claim 1 wherein the flat sheet membranes are essentially rectangular with a pair of longer edges and a pair of shorter ends and the flat sheet membranes are held by their longer edges in the potting material.

4. The membrane module of claim 1 wherein the potting material extends along essentially the entire length of the housing.

5. The membrane module of claim 1 comprising one or more fillers embedded in the potting material.

6. The membrane module of claim 1 wherein one or more ends of the membranes are held in one or more grills at the ends of the housing.

7. The membrane module of claim 1 wherein the flat sheet membranes have an inner cavity.

8. The membrane module of claim 7 wherein the flat sheet membranes comprise a spacer fabric.

9. The membrane module of claim 7 wherein the flat sheet membranes are integrated permeate channel membranes.

10. The membrane module of claim 1 having one or more openings through the housing and into part of the potting material forming a permeate withdrawal path.

11. The membrane module of claim 10 wherein the openings are slots cut in the housing and part way through the potting material.

12. The membrane module of claim 10 comprising a permeate collection pipe passing through the membranes.

13. The membrane module of claim 1 wherein each flat sheet membrane has two porous outer surfaces separated by a drainage layer.

14. The membrane module of claim 1 wherein the potting material is one of urethane and epoxy.

* * * * *